United States Patent [19]

Yamanaka

[11] Patent Number: 4,611,675
[45] Date of Patent: Sep. 16, 1986

[54] MASS METER

[75] Inventor: Masami Yamanaka, Miki, Japan

[73] Assignee: Yamato Scale Company, Limited, Japan

[21] Appl. No.: 729,490

[22] Filed: May 1, 1985

[51] Int. Cl.⁴ .................. G01G 19/00; G01G 19/22; G01G 3/08
[52] U.S. Cl. .................................. 177/1; 177/25; 177/200; 177/229
[58] Field of Search ............. 177/25, 164, 200, 210 R, 177/210 EM, 210 FP, 229, 1

[56] References Cited

U.S. PATENT DOCUMENTS

| | | | |
|---|---|---|---|
| 2,969,228 | 1/1961 | Appius | 177/229 |
| 3,692,128 | 9/1972 | Gallo | 177/210 FP |
| 4,050,530 | 9/1977 | Storace | 177/1 |
| 4,156,361 | 5/1979 | Melcher et al. | 177/210 EM X |
| 4,258,811 | 3/1981 | Franzon et al. | 177/200 |

FOREIGN PATENT DOCUMENTS

| | | | |
|---|---|---|---|
| 52-149154 | 12/1977 | Japan | |
| 113724 | 7/1983 | Japan | 177/164 |
| 2128329A | 9/1983 | United Kingdom | |

Primary Examiner—H. Broome
Assistant Examiner—Patrick W. Foster
Attorney, Agent, or Firm—Senniger, Powers, Leavitt and Roedel

[57] ABSTRACT

A mass meter of the type of conventional weighing scale having an elastic cantilever mechanism provided with a weighing cradle, and a mechanoelectric transducer for sensing a strain of the cantilever to produce a weight indicative signal, which further includes, for cancelling the effect of gravity, a reference weight accompanied with its loading and unloading means, and an arithmetic unit for processing the weight data obtained in both reference weight loaded and unloaded states to calculate the mass of an article on the weighing cradle.

6 Claims, 3 Drawing Figures

MASS METER

BACKGROUND OF THE INVENTION

This invention relates to a mass meter of the type of a conventional weighing scale having a cantilever mechanism provided with a weighing cradle and an electromechanical transducer for sensing a strain of the cantilever to produce a weight indicative signal for measuring the mass of an article on the weighing cradle from which the effect of gravity has been removed.

An example of such type of weighing scale is disclosed in the opened British patent specification No. 2128329A (which is incorporated herein by reference) having the same named inventor. This weighing scale includes two elastic cantilever beam members having different bending rigidity and being arranged in parallel in a vertical plane, a weighing cradle fixed to one of the elastic beam members having greater bending rigidity, a metal wire stretched between the free ends of both elastic beam members. An electromechanoelectric transducer for converting mechanical vibration of the metal wire into an electric oscillation having the same frequency, and means for measuring the frequency and calculating therefrom weight of an article on the weighing cradle. As well known in the art, such a weighing scale measures a force applied to the article by the gravity, that is, the product of mass of the article and acceleration of gravity. Therefore, in using such type of weighing scale to measure the mass, the mass must be calculated from the measured weight and the acceleration of gravity at the place of measurement.

The opened Japanese patent specification No. 52-149154 discloses a weighing scale which uses a reference weight to be both loaded and unloaded for compensating for deviation of the zero-point caused, for example, by variation of the acceleration of gravity. However, the weighing scale disclosed in that specification measures the weight of the article but cannot provide its mass.

SUMMARY OF THE INVENTION

Accordingly, an object of this invention is to provide a novel mass meter of the type of weighing scale disclosed in the abovementioned British specification, which can measure mass of an article put on the cradle without any affect due to variation of the acceleration of gravity.

In accordance with this invention, a mass meter comprises a main elastic cantilever member having a force point at its free end, an auxiliary elastic cantilever member having less bending rigidity than the main elastic member and being arranged in parallel in a common vertical plane with the main elastic member, a force detecting element disposed between and coupled to the free ends of the main and auxiliary elastic members, means for converting the force applied to the detecting element into an electric signal, and means for processing the signal to calculate the desired force. The device of this invention further includes a reference weight having a known mass, means for selectively loading and unloading the reference weight, respectively, on and from the free end of the auxiliary elastic member, a first memory for storing the force value provided by the processing means when the reference weight is unloaded, a second memory for storing the force value provided by the processing means when the reference weight is loaded, a subtracter for calculating the difference of the contents of first and second memories, a third memory for storing the output difference of the subtracter, a divider for dividing by the content of the third memory a force value provided by the processing means when the main elastic member is loaded with an article for measurement, and a multiplier for multiplying the resultant signal of the divider by the mass of the reference weight.

Now, the invention will be described in more detail with reference to the accompanying drawings representing an embodiment thereof.

DESCRIPTION OF A PREFERRED EMBODIMENT

Figure 1:
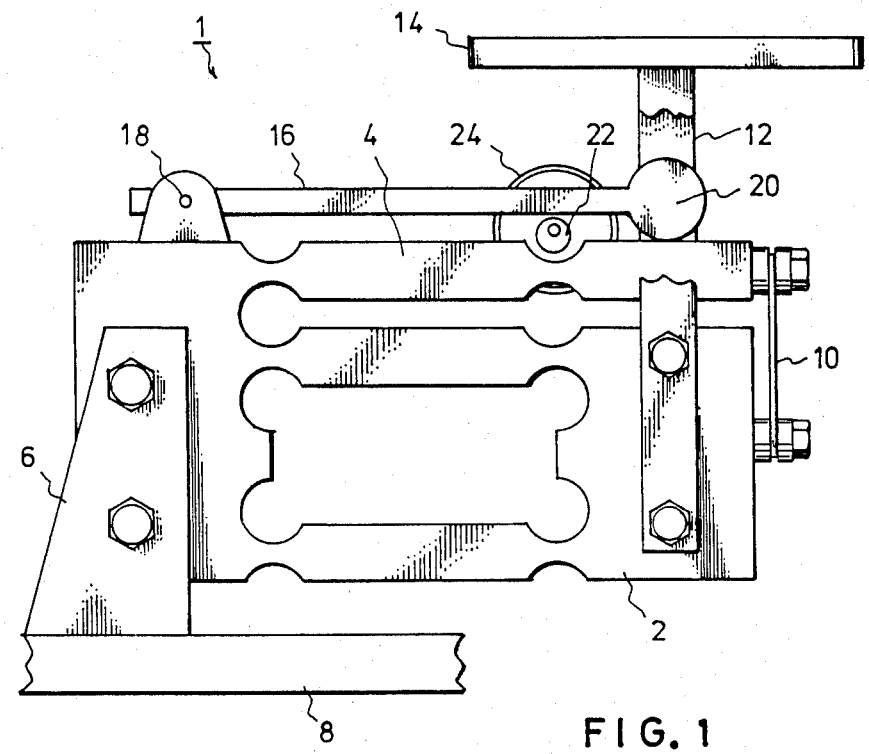
FIG. 1 is a side view representing a mechanical portion of an embodiment of the mass meter according to this invention.

In the embodiment of FIG. 1, a weighing scale 1 includes a main elastic member 2 having the shape of a rectangular frame and an auxiliary elastic member 4 having the shape of a cantilever beam. The elastic members 2, 4 are formed integrally so as to be coupled together at one end thereof which is fixed through a bracket 6 to a stationary bed 8 of the device. A metal wire 10 is fixed at both ends to the free ends of both elastic members 2 and 4 and stretched therebetween as a force detecting element as described in the aforementioned British specification. A weighing cradle 14 is fixed to the free end of the main member 2 through a support member 12. The main elastic member 2 and the auxiliary elastic member 4 are arranged in parallel in a common vertical plane and the former has a greater bending rigidity than the latter. When an article for measurement is put on the weighing cradle 14, the main member 2 is flexed vertically by the article due to gravity and the auxiliary member 4 follows it due to the tension of the wire 10. The resultant tension of wire 10 has a specific relation to the force applied thereto, that is, the weight of the article. As described in detail in the aforementioned British specification, the frequency of vibration of the wire 10 is related to its tension and, accordingly, to the weight of article.

As a feature of this invention, a reference weight 20 having a known mass m, which is coupled to a lever 16 pivoted at a fulcrum 18 fixed with respect to the stationary bed 8, is disposed just above the force point of main member 2. An eccentric cam wheel 22 driven by a motor 24 which is controlled by a reference weight loading control 26 (FIG. 2) is disposed under the lever 16 to enable selective loading of the reference weight 20 onto the auxiliary elastic member 4 for the purpose as described later.

Figure 2:
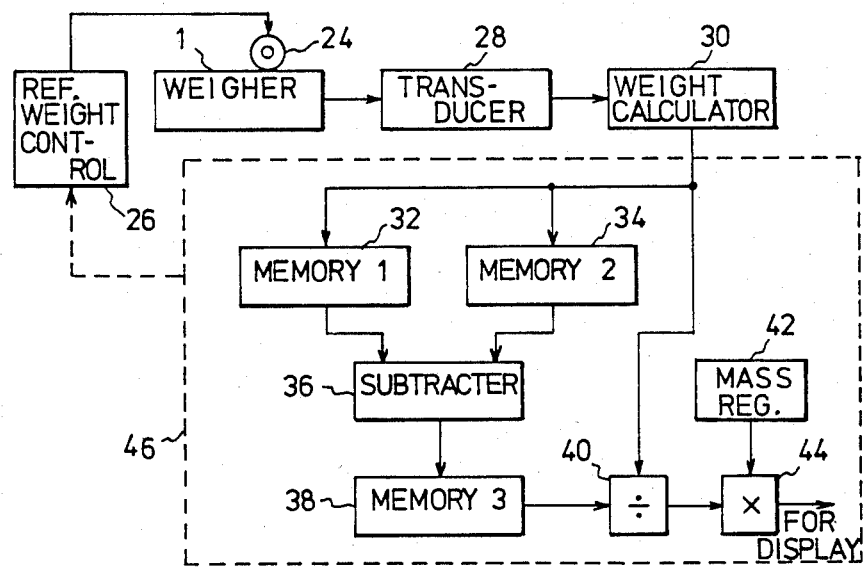
FIG. 2 is a block diagram representing an electrical portion of the embodiment of FIG. 1.

Referring next to FIG. 2, the mechanical vibration of metal wire 10 of the weigher 1 is converted by an electromechanical transducer 28 into an electric signal having the same frequency as the wire 10. This frequency is measured and converted into the weight of article in a weight calculator 30. Detailed structure and operation of the transducer 28 and weight calculator 30 are described in the aforementioned British specification and, therefore, will not be described further here.

When the reference weight 20 is removed from the auxiliary member 4 and an article is put on the weighing cradle 14, the weight calculator 30 will produce a signal indicative of the weight of article $W=Mg$, where M is mass of article and g is acceleration of gravity. This value Mg is stored in a first memory 32. Then, the motor 24 is driven under control of reference weight loading control 26 to lower the reference weight 20 having mass m onto the auxiliary member 4. Thus, the auxiliary member 4 is flexed further to reduce the tension of the wire 10 and the weight calculator 30 will produce a signal indicative of reduced weight $W=Mg-mg$. This value is stored in a second memory 34. The contents of memories 32 and 34 are applied to a subtracter 36 which produces a difference therebetween, that is, $Mg-(Mg-mg)=mg$. This value is stored in a third memory 38. Then, the motor 24 is driven again to remove the reference weight 20 to cause the weight calculator 30 to produce again the weight Mg. This value is applied to a divider 40 and divided by the content of memory 38 and, therefore, the divider 40 will produce a signal indicative of $Mg/mg=M/m=a$ which is independent of the acceleration of gravity. The known mass m of the reference weight 20 is previously stored in a reference mass register 42 and is applied to a multiplier 44 and multiplied therein by the output value a of the divider 40 to obtain $am=(M/m)m=M$. Thus, the mass of article M is provided independently to any differences in acceleration of gravity and displayed by a suitable display device (not shown). If the place of measurement is unchanged (that is, if the accleration of gravity g is unchanged), the mass of any article can be obtained by putting that article on the weighing cradle 14 and keeping the reference weight 20 unloaded.

The weight mg of reference weight 20 is selected in relation to the weight of the article and the bending rigidity ratio of first and second members 2 and 4. For example, if the weight of the article is about 1,000 grams and the ratio of bending rigidity is 9/1, the preferable weight of the reference weight 20 is about 100 grams.

The operation of the elements 32 to 44 of FIG. 2 can be effected by a single commercially available microcomputer 46 coupled to receive the output signal W from the weight calculator 30, to display the desired mass M and also to supply a command to the reference weight loading control 26. The process may be executed using a program as shown in FIG. 3.

First, assuming that an article of unknown mass is on the cradle 14, the reference weight 20 is unloaded and the weight mg of reference weight 20 is stored in advance in a third memory of the microcomputer. The weight W is provided from weight calculator 30. This weight data is read in step 50 and, in the next step 52, it is inquired whether the reference weight is loaded. The answer is "NO" and the process is advanced to step 54. In this step, the weight $W=Mg$ is divided by the content mg of third memory and the result is multiplied by the reference mass m stored previously. The resultant product is displayed as the wanted or desired mass in step 56. In the next step 58, the weight data $W=Mg$ is written into a first memory on the microcomputer and, in step 60, a command is provided to the reference weight loading control 26 to load the reference weight 20. Then, the process returns to step 50 and the weight data $W=Mg-mg$ is read. In step 52, the answer to the inquiry is "YES" and the weight data $Mg-mg$ is written in a second memory of the microcomputer in step 62. Thereafter, another command is provided to the control 26 to unload the reference weight 20 in step 64. In the next step 66, the weight data $W=Mg$ is read again and compared with the content Mg of first memory and, in step 68, it is inquired whether both values are equal or not. If they are equal, it indicates that the article is unchanged after step 58 and the content of second memory is usable. Then, the difference between the contents of first and second memories is calculated and written into third memory in step 70. Thereafter, the process proceeds through steps 50, 52 and 54 and the wanted mass is displayed again in step 56. However, if no equality is obtained in step 68, the same steps are repeated until it is obtained.

Figure 3:
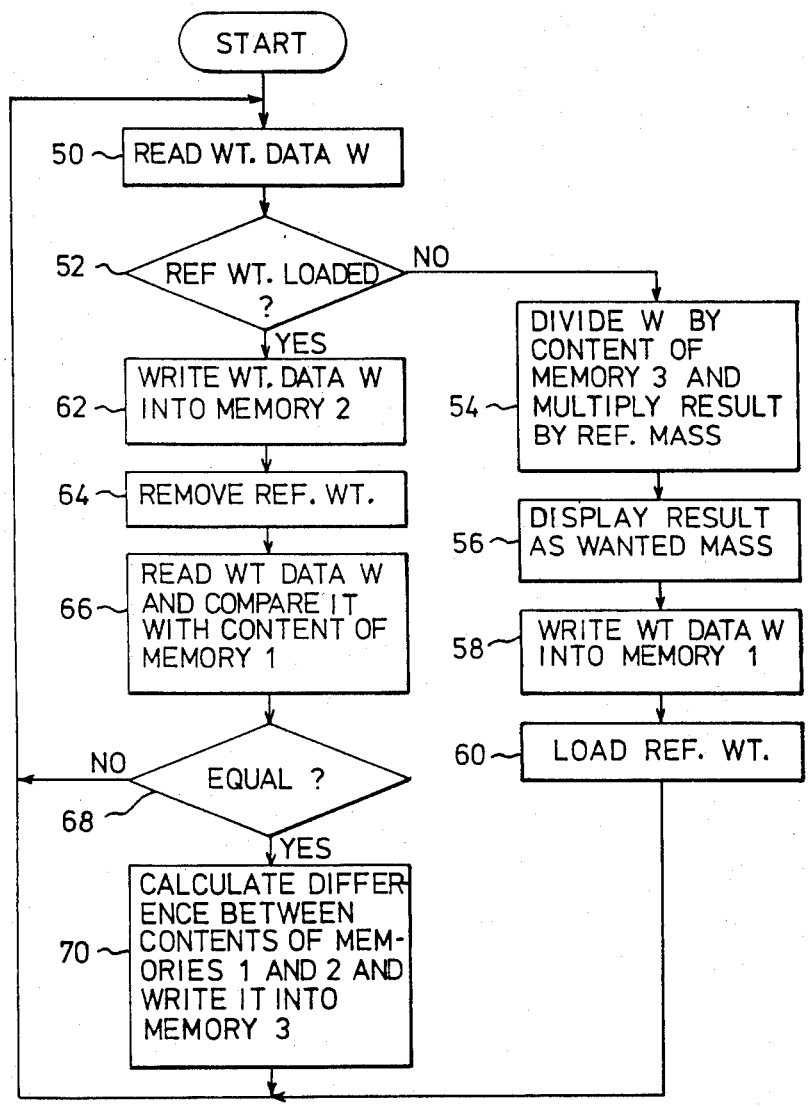
FIG. 3 is a flow chart representing a program of the operation executed by the embodiment of FIGS. 1 and 2.

According to the flow chart of FIG. 3, this program is repeated endlessly as loading and unloading the reference weight 20. Such operation remove errors of measurement caused by relatively quick changes in the measuring conditions e.g., the weight cradle 14 has not stabilized.

It should be noted that the above description has been made only for illustrative purpose and various modifications and changes can be made within the scope of this invention as defined in the appended claims. For example, the loading and unloading operation of the reference weight 20 may be effected manually rather than automatically. The shape, supporting mechanism and loading/unloading mechanism of the reference weight may be modified arbitrarily.

In practice, a correct reading is not obtainable unless the weighing system reaches its equilibrium or stable state. Therefore, it will be preferable to insert a sttep of testing whether this equilibrium attained after each step of loading or unloading of the article or reference weight in order to prevent an incorrect reading of the weight. While, in the above embodiment, the force detecting element is shown as a vibratory wire 10, any alternative, such as a piezoelectric element, may be used.

I claim:
1. A mass meter, comprising
a main elastic cantilever member having a force point at a free end thereof,
an auxiliary elastic cantilever member having a lower bending rigidity than said main elastic member and being arranged in parallel in a common vertical plane with said main elastic member,
a force detecting element disposed between and coupled to the free end of said main elastic member and a free end of said auxiliary elastic member,
means for converting a force applied to said force detecting element into an electric signal, and
means for processing said electric signal to calculate said applied force;
characterized by the device further comprising
a reference weight having a known mass,
means for selectively loading said reference weight on the free end of said auxiliary elastic member, and
computing means including:
a first memory for storing an output value of force provided by said processing means when said reference weight is unloaded,
a second memory for storing an output value of force provided by said process means when said reference weight is loaded, a subtracter for calculating a difference of the contents of said first and second memories, a third memory for storing an output value representative of the difference of said subtracter, a divider for dividing an output value of force provided by said processing means when the weight of an article whose mass is to be measured is applied to the force point of said main elastic member, by the content of said third memory, thereby to derive an output value; and a multiplier for multiplying said mass of said reference weight by the output value of said divider thereby to derive the mass of the article.

2. The mass meter, according to claim 1, characterized by the device further comprising means for repeating the loading and unloading of said reference weight, said computing means including means for comparing the output value of force of said processing means when said reference weight is unloaded with the content of said first memory and, when coincidence is obtained, enabling said subtracter.

3. A mass meter for determining the mass of an article comprising:

force detecting means comprising a pair of cantilever members extending generally parallel to one another generally in the same vertical plane, said cantilever members having fixed inner ends and free outer ends, a force detecting element extending between and connected to the free outer ends of said cantilever members, and means for detecting a force applied to said force detecting element and for producing a signal having a value which varies as a function of the magnitude of the force;

means for applying an article to said force detecting means to produce a signal having a first value;

means for applying a reference weight of known mass to said force detecting means when said article is applied to said force detecting means to produce a signal having a second value; and computing means including:

means for storing said first value;

means for storing said second value;

means for subtracting said stored first value from said stored second value to produce a difference;

means for dividing said first value by said difference to produce a ratio; and means for multiplying the mass of the reference weight by said ratio thereby to produce the mass of the article.

4. The mass meter according to claim 3 further comprising means for repeatedly applying and removing the reference weight and means for applying said article to said force detecting means when said reference weight is removed from said force detecting means to produce a signal having a third value and said computing means including means for enabling said subtracting means when said third value and said stored first value are equal.

5. A method of measuring the mass of an article using a force detecting means of the type comprising a pair of cantilever members extending generally parallel to one another generally in the same vertical plane, said cantilever members having fixed inner ends and free outer ends, a force detecting element extending between and connected to the free outer ends of said cantilever members, and means for detecting a force applied to said force detecting element and for producing a signal having a value which varies as a function of the magnitude of the force, said method comprising the steps of:

applying an article to said force detecting means to produce a signal having a first value;

storing said first value;

providing a reference weight of known mass;

applying said reference weight to said force detecting means when said article is applied to the force detecting means to produce a signal having a second value;

storing said second value;

subtracting said stored first value from said stored second value to produce a difference;

dividing said first value by said difference to produce a ratio; and multiplying the mass of the reference weight by said ratio thereby to produce the mass of the article.

6. The method according to claim 5 further comprising the steps of repeatedly applying and removing the reference weight, applying said article to said force detecting means when said reference weight is removed from said force detecting means to produce a signal having a third value, and enabling the subtraction when said third value and said first value are equal.

* * * * *